(12) United States Patent
Hayashi et al.

(10) Patent No.: US 7,034,658 B2
(45) Date of Patent: Apr. 25, 2006

(54) STARTING CONTROLLER

(75) Inventors: Masaki Hayashi, Aichi (JP); Masaki Yoshino, Aichi (JP); Tomoyuki Funayama, Toyota (JP); Toshinori Aoki, Toyota (JP); Yoshinori Fukuoka, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 268 days.

(21) Appl. No.: 10/740,175

(22) Filed: Dec. 18, 2003

(65) Prior Publication Data

US 2004/0217897 A1    Nov. 4, 2004

(30) Foreign Application Priority Data

Dec. 19, 2002  (JP) .............................. 2002-368117

(51) Int. Cl.
- *B60R 25/00* (2006.01)
- *B60R 25/04* (2006.01)
- *H04B 1/00* (2006.01)

(52) U.S. Cl. .................. 340/5.72; 340/5.73; 307/10.3; 307/10.5

(58) Field of Classification Search .............. 340/5.72, 340/5.73; 307/10.5
See application file for complete search history.

(56) References Cited

U.S. PATENT DOCUMENTS

| 6,259,168 B1 * | 7/2001 | Okada ...................... 307/10.5 |
| 6,867,684 B1 * | 3/2005 | Koblbauer ................ 307/10.5 |
| 6,876,292 B1 * | 4/2005 | Onuma et al. ............ 340/5.72 |

FOREIGN PATENT DOCUMENTS

| FR | 2810776 | 12/2001 |
| FR | 2839031 | 10/2003 |
| JP | 2001-227218 | 8/2001 |
| JP | 2002-29385 | 1/2002 |

* cited by examiner

*Primary Examiner*—Brian Zimmerman
*Assistant Examiner*—Clara Yang
(74) *Attorney, Agent, or Firm*—Synnestvedt & Lechner LLP

(57) ABSTRACT

An engine starting controller for a vehicle provided with a smart ignition function. The controller communicates with a portable communicator including an emergency key. When the battery of the portable communicator is drained, the emergency key is used to open the door lock and start the engine. A seat for depositing the emergency key is provided in the passenger compartment. The starting of the engine is enabled when the emergency key is deposited on the seat. The seat is illuminated or moved to notify the driver where to deposit the key.

19 Claims, 4 Drawing Sheets

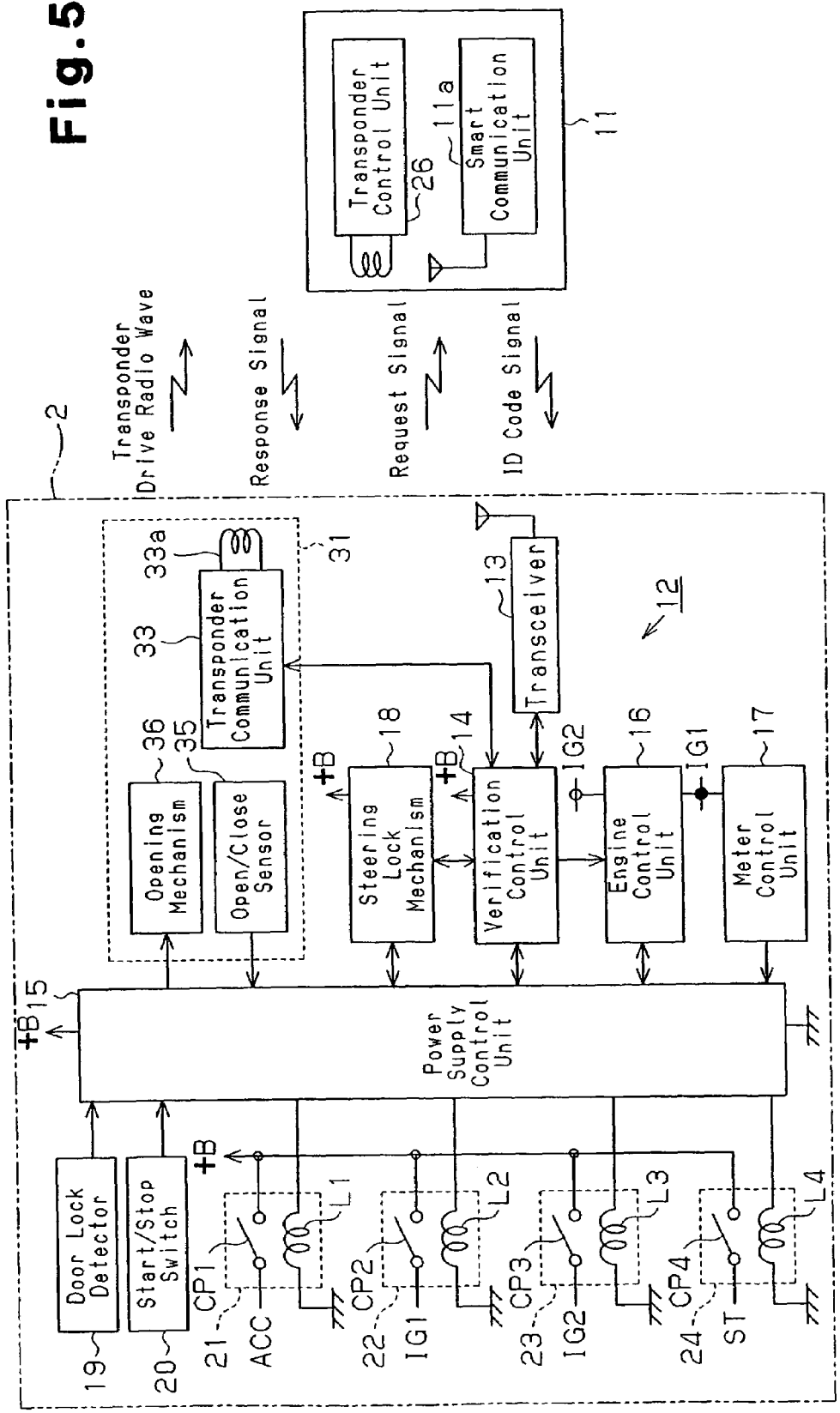

STARTING CONTROLLER

BACKGROUND OF THE INVENTION

The present invention relates to a starting controller for selectively starting and stopping an engine with a one-push operation.

In recent years, in addition to improvement in the basic performance and security of a vehicle, there is a demand for improving the operability of a vehicle. To improve the operability, an engine starting control system provided with a smart ignition function has been proposed (e.g., Japanese Laid-Open Patent Publication Nos. 2002-29385 and 2001-227218). In such type of an engine start control system, when a driver carrying a portable communicator enters the passenger compartment of a vehicle, mutual communication automatically occurs between the portable communicator and an engine control unit, which is installed in the vehicle. The starting of the engine is enabled when the mutual communication is established. The engine is started and stopped by operating a start/stop switch, which is arranged in the vehicle compartment. Accordingly, after entering the vehicle, the driver only needs to operate the start/stop switch to start and stop the engine. This improves the operability.

In such an engine start control system, it is desirable that the starting of the engine be enabled even when the battery of the portable communicator is drained or when communication cannot be performed normally. For this reason, an engine start control system of the prior art has a mechanical key or a transponder communication mechanism, which are added as an emergency key to the portable communicator. In the passenger compartment, the mechanical key is inserted in a predetermined key cylinder or the portable communicator is placed in a predetermined location to enable the starting of the engine.

However, the engine is seldom started under such state of emergency. Thus, the driver may forget where to insert the mechanical key or where to place the portable device. As a result, the driver would not be able to start the engine in such an emergency.

SUMMARY OF THE INVENTION

It is an object of the present invention to provide an engine start controller that enables starting of the engine during an emergency.

To achieve the foregoing and other objectives and in accordance with the purpose of the present invention, an engine starting controller is provided. The engine starting controller controls the opening and closing of a door lock and for controlling the starting of an engine for a vehicle in accordance with communication performed with a portable communicator having a communication mechanism and an emergency key mechanism. The engine starting controller has an emergency engine start enabling device and a deposit instruction device. The emergency engine start enabling device enables the starting of the engine when the emergency key mechanism is deposited on an emergency key seat arranged in a passenger compartment of the vehicle. The deposit instruction device instructs the depositing of the emergency key mechanism on the emergency key seat when the door lock is opened with the emergency key mechanism.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a schematic block diagram showing the structure of the engine start control system of FIG. 4.

DETAILED DESCRIPTION OF THE PREFERRED EMBODIMENTS

A one-push type engine start control system 1 according to a first embodiment of the present invention will now be discussed with reference to FIGS. 1 to 3. The engine start control system 1 is employed in a vehicle including an electronic steering lock mechanism.

Figure 1:
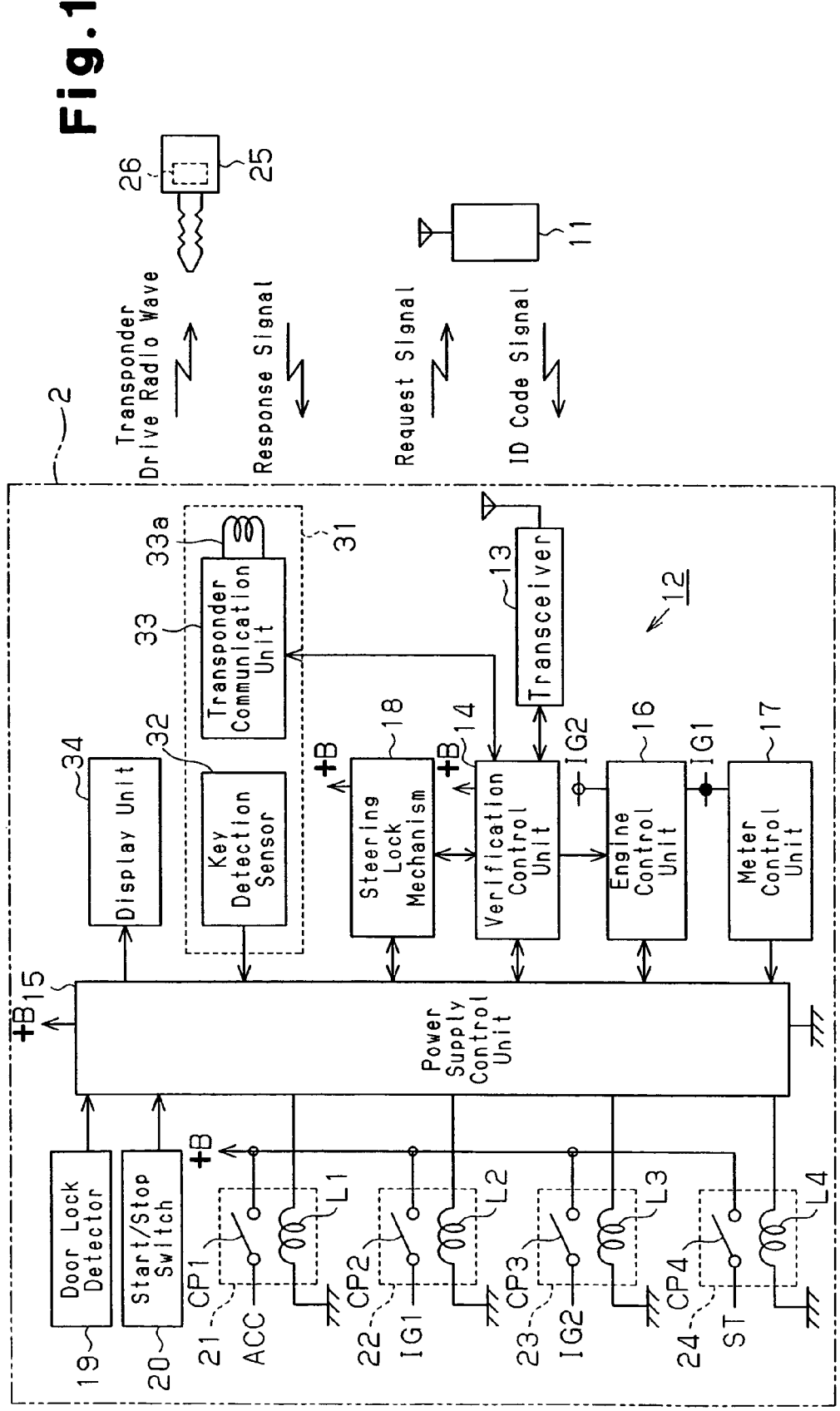
FIG. 1 is a schematic structure of an engine start control system according to a first embodiment of the present invention.

Referring to FIG. 1, the engine start control system 1 includes a portable communicator 11, a vehicle controller 12 installed in a vehicle 2, and an emergency key mechanism, or emergency key 25.

The portable communicator 11 is carried by an occupant of the vehicle 2, such as a driver or a passenger, and performs mutual communication with the vehicle controller 12. More specifically, the portable communicator 11 automatically transmits an ID code signal, which includes a predetermined ID code, when receiving a request signal from the vehicle controller 12. The ID code signal is transmitted as a radio wave having a predetermined frequency (e.g., 300 MHz).

The emergency key 25 is a mechanical key added to the portable communicator 11 and includes a transponder control unit 26. The emergency key 25 performs mutual communication with the vehicle controller 12. More specifically, the emergency key 25 generates electromotive force when receiving a transponder drive radio wave from the vehicle controller 12. Then, the emergency key 25 uses the electromotive force to generate a response signal including a transponder code.

The vehicle controller 12 includes a transceiver 13, a verification control unit 14, a power supply control unit 15, an engine control unit 16, a meter control unit 17, a steering lock mechanism 18, and an emergency key seat 31. Each of the control units 14 to 17 includes a central processing unit (CPU), a read only memory (ROM), and a random access memory (RAM). The verification control unit 14 is electrically connected to the transceiver 13, the power supply control unit 15, the engine control unit 16, and a steering lock mechanism 18. The power supply control unit 15 is electrically connected to the engine control unit 16, the meter control unit 17, the steering lock mechanism 18, a door lock detector 19, and a start/stop switch 20. In the preferred embodiment, the start/stop switch 20 is a momentary push button switch. Communication lines (not shown)

electrically connects the verification control unit 14, the engine control unit 16, the meter control unit 17, and the steering lock mechanism 18 to one another.

The transceiver 13 modulates a request signal output from the verification control unit 14 to a radio wave having a predetermined frequency (e.g., 134 kHz) and transmits the radio wave to predetermined ranges inside the passenger compartment and outside the vehicle 2. When receiving the ID code signal from the portable communicator 11 though an antenna, the transceiver 13 demodulates the ID code signal to a pulse signal and sends the pulse signal to the verification control unit 14.

The verification control unit 14 intermittently sends a request signal to the transceiver 13. When receiving the ID code signal from the transceiver 13, the verification control unit 14 compares and verifies an ID code included in the ID code signal with a predetermined ID code, which is stored in the verification control unit 14. If the ID codes match when the ID code signal has been transmitted in response to the request signal transmitted outside the vehicle 2, the verification control unit 14 sends a drive signal to a door lock actuator (not shown) to automatically open a door lock. If the ID codes match when the ID code signal has been transmitted in response to the request signal transmitted inside the vehicle compartment, the verification control unit 14 sends an unlock signal to the steering lock mechanism 18. When receiving an unlock completion signal from the steering lock mechanism 18, the verification control unit 14 sends a start enabling signal to the power supply control unit 15 and the engine control unit 16.

When an ID code signal cannot be received in response to the request signal transmitted outside the vehicle 2 from the transceiver 13 or when the ID code of the ID code signal received by the transceiver 13 does not match the ID code of the verification control unit 14, the verification control unit 14 sends a drive signal to the door lock actuator to automatically close the door lock. Further, when an ID code signal cannot be received in response to the request signal transmitted to the inside of the passenger compartment from the transceiver 13 or when the ID code of the ID code signal received by the transceiver 13 does not match the ID code of the verification control unit 14, the verification control unit 14 sends a start disabling signal to the power supply control unit 15 and the engine control unit 16. The verification control unit 14 stops sending the request signal to the transceiver 13 when receiving an engine drive signal, which indicates that the engine is running, from the power supply control unit 15. In the preferred embodiment, the unlock signal, the unlock completion signal, the start enabling signal, the start disabling signal, and the engine drive signal are binary signals having a predetermined number of bits. Each signal has a unique pattern. When an abnormality such as a short-circuit or a line breakage occurs in the communication lines between the verification control unit 14, the control units 15 and 16, and the steering lock mechanism 18, the pattern of each binary signal changes. This enables detection of an abnormality with the control units 14 to 16 and the steering lock mechanism 18.

An accessory (ACC) relay 21, a first ignition (IG1) relay 22, a second ignition (IG2) relay 23, and a starter (ST) relay 24 respectively have coils L1, L2, L2, and L4. One end of each of the coils L1, L2, L2, and L4 is connected to the power supply control unit 15. More specifically, the power supply control unit 15 is connected to one end of the coils L1 to L4 of the relays 21 to 24 by a switching device, such as a FET (not shown). The other end of each coil L1 to L4 is grounded. Each relay 21 to 24 is activated when an activation signal is output from the power supply control unit 15. In the preferred embodiment, the activation signal generated by the power supply control unit 15 goes high to activate the relays 21 to 24 and goes low to inactivate the relays 21 to 24.

The starting of the engine is enabled when the power supply control unit 15 receives the start enabling signal from the verification control unit 14. If the start/stop switch 20 is pushed and a push operation signal is received when the starting of the engine is enabled, the power supply control unit 15 sends the activation signal to the IG1 relay 22, the IG2 relay 23, and the ST relay 24. The activation signal activates the IG1 relay 22, the IG2 relay 23, and the ST relay 24 and closes respective contacts CP2, CP3, and CP4. The contacts CP2 to CP4 each have one end connected to a battery terminal. The other end of the contact CP2 is connected to a power supply terminal of the engine control unit 16 and the meter control unit 17. The other end of the contact CP3 is connected to the power supply terminal of the engine control unit 16. The other end of the contact CP4 is connected to an engine starter (not shown). Thus, the engine control unit 16 is supplied with power through two routes. When the IG1 relay and the IG2 relay 23 are activated, current flows to the engine control unit 16 and the meter control unit 17. When the ST relay 24 is activated, the engine starter is activated. When the start/stop switch 20 is pushed, the power supply control unit 15 sends a start signal to the engine control unit 16. In the preferred embodiment, the push operation signal goes high when the start/stop switch 20 is pushed and remains low when the push operation signal is not pushed.

When receiving the start enabling signal from the verification control unit 14 and the start signal at a high level from the power supply control unit 15, the engine control unit 16 executes fuel injection control and ignition control. In other words, the engine control unit 16 performs fuel injection control and ignition control in accordance with whether the start signal is high or low. The engine control unit 16 detects whether the engine has been started from an ignition pulse or an alternator output and sends an ignition completion signal to the power supply control unit 15 when determining that the engine has been started.

When the ignition completion signal is received from the engine control unit 16, the power supply control unit 15 stops providing the ST relay 24 with the activation signal to inactivate the ST relay 24. The power supply control unit 15 also provides the ACC relay 21 with the activation signal. One end of the contact CP1 for the ACC relay 21 is connected to a battery. The other end is connected to various electric accessory devices.

The meter control unit 17 controls the operation of meters in the instrument panel of the vehicle 2. When the meter control unit 17 is operated, the meter control unit 17 provides the power supply control unit 15 with a signal representing vehicle information, such as the vehicle velocity.

The steering lock mechanism 18 includes a lock detection switch and an actuator (neither shown). When the unlock signal is received from the verification control unit 14, the steering lock mechanism 18 sends a drive signal (unlock drive signal) to the actuator to unlock the steering wheel. The actuator then moves a lock pin (not shown) to disengage the lock pin from a steering shaft. In accordance with a control signal from the power supply control unit 15 and an output signal from a door courtesy switch, the steering lock mechanism 18 sends a drive signal (lock drive signal) to the actuator to lock the steering wheel when predetermined conditions are satisfied. The actuator then moves the lock pin to engage the lock pin with the steering shaft. The lock detection switch is activated when the lock pin is completely disengaged from the steering shaft. In other words, the lock detection switch detects whether the lock pin is engaged with or disengaged from the steering shaft. When the steering lock mechanism 18 recognizes by means of the lock detection switch that the lock pin is in the disengaged state, the steering lock mechanism 18 sends an unlock signal to the verification control unit 14. When the steering lock mechanism 18 recognizes by means of the lock detection switch that the lock pin is in the engaged state, the steering lock mechanism 18 sends a lock signal to the verification control unit 14.

The emergency key seat 31 includes a key detection sensor 32 and a transponder communication unit 33. The key detection sensor 32 is electrically connected to the power supply control unit 15, and the transponder communication unit 33 is connected to the verification control unit 14.

Figure 2:
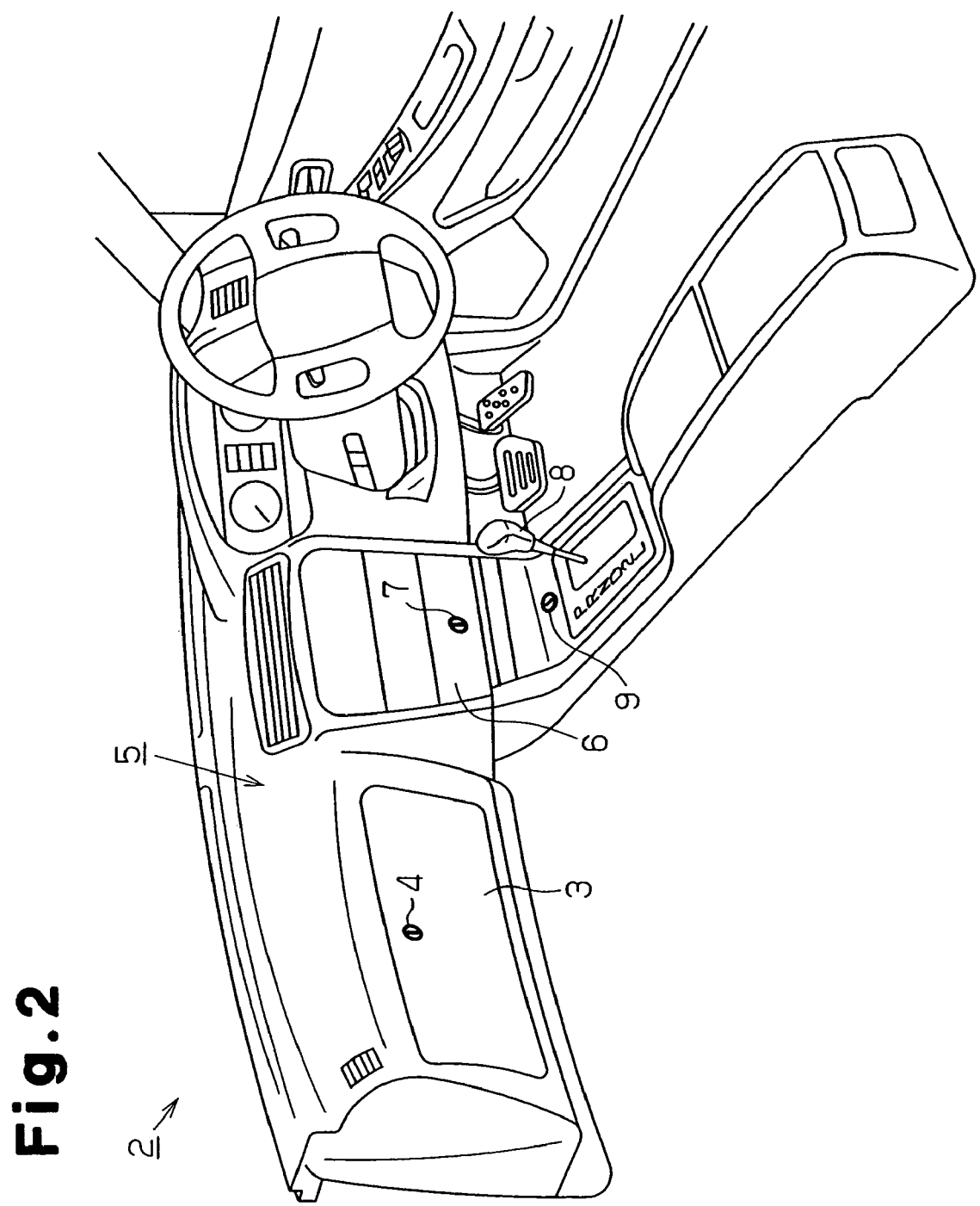
FIG. 2 is a perspective view showing a passenger compartment of a vehicle in which the engine start control system of FIG. 1 is installed.
Figure 3:
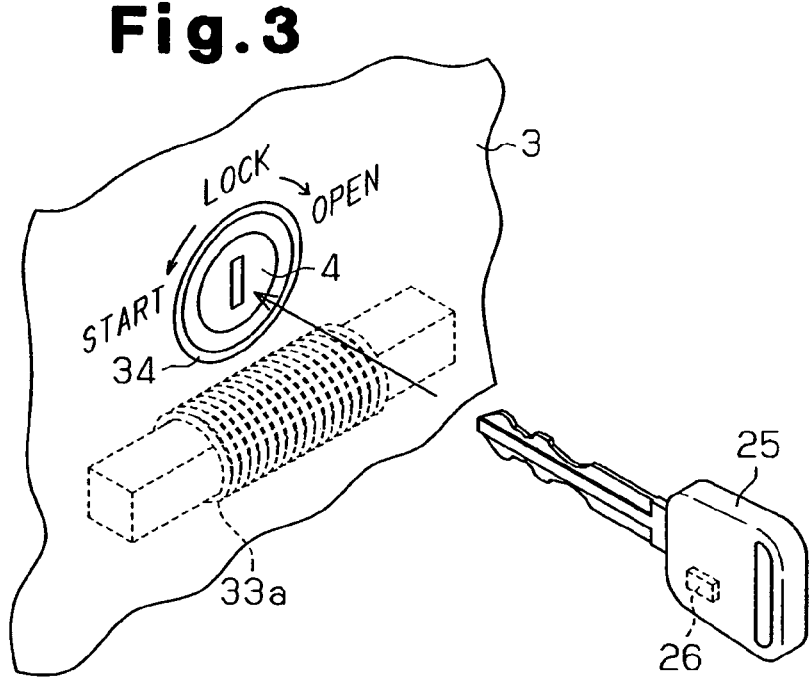
FIG. 3 is an enlarged perspective view showing part of the passenger compartment in which the engine start control system of FIG. 1 is installed.

Referring to FIGS. 2 and 3, in the passenger compartment, a glove compartment 3 has a key cylinder 4. The emergency key 25 is inserted in the key cylinder 4. The key cylinder 4 functions as the emergency key seat 31 and part of a locking mechanism for locking the glove compartment. The key detection sensor 32 and the transponder communication unit 33 are arranged in an innermost portion of the key cylinder 4. As shown by the broken lines in FIG. 3, a communication antenna 33*a* of the transponder communication unit 33 is arranged near the innermost portion of the key cylinder 4.

When the emergency key 25 is turned in the clockwise direction, the glove compartment 3 is unlocked. When the emergency key 25 is turned in the counterclockwise direction, the key detection sensor 32 detects the counterclockwise turning and generates a detection signal, which is provided to the power supply control unit 15. When the power supply control unit 15 receives the detection signal, the vehicle controller 12 executes emergency engine start enabling control. In the preferred embodiment, the vehicle controller 12 functions as an emergency engine start enabling device. The key cylinder 4 locks the glove compartment 3 at a neutral position (FIG. 3). The key cylinder 4 allows the insertion and removal of the emergency key 25 at only the neutral state. When the emergency key 25 is turned from the neutral state, the key cylinder 4 disables the removal of the emergency key 25.

The emergency engine start enabling control executed when the emergency key 25 is inserted in the key cylinder 4 will now be discussed.

Referring to FIG. 1, when the power supply control unit 15 receives the detection signal from the key detection sensor 32, the power supply control unit 15 sends a transponder drive signal to the verification control unit 14. In response to the transponder drive signal, the verification control unit 14 sends a drive signal to the transponder communication unit 33. In response to the drive signal, the transponder communication unit 33 sends a transponder drive radio wave having a predetermined frequency (in the preferred embodiment, 134 kHz) to the emergency key 25 via the communication antenna 33*a*. The transponder drive radio wave is transmitted to a small range around the key cylinder 4. When the transponder drive radio wave is transmitted in a state in which the emergency key 25 is inserted in the key cylinder 4, the transponder control unit 26 of the emergency key 25 receives the transponder drive radio wave.

When receiving the transponder drive radio wave, the transponder control unit 26 sends a response signal to the transponder communication unit 33 of the vehicle controller 12. When receiving the response signal, the transponder communication unit 33 demodulates the response signal to generate a received signal and sends the received signal to the verification control unit 14. The verification control unit 14 then verifies a transponder code included in the received signal with a transponder code stored beforehand in the verification control unit 14 (transponder verification). When the transponder codes match, the verification control unit 14 sends an unlock request signal to the steering lock mechanism 18. When the steering lock mechanism 18 receives an unlock completion signal from the steering lock mechanism 18, the verification control unit 14 sends a start enabling signal to the power supply control unit 15 and the engine control unit 16. In other words, the same control as when normal communication (smart communication) is established between the portable communicator 11 and the vehicle controller 12 is executed here. Thus, in a state of emergency such as when communication of the portable communicator 11 with the vehicle controller 12 is disabled due to battery drainage, the emergency key 25 is inserted, or deposited in the key cylinder 4 of the glove compartment 3 to enable the starting of the engine.

The vehicle controller 12 disables the starting of the engine when the emergency key 25 is turned from the engine start enabling position to the neutral position. If the emergency key 25 is turned from the engine start enabling position to the neutral position when the engine is running, the engine is stopped.

The door lock detector 19 is connected to the power supply control unit 15. The door lock detector 19 detects whether the door lock of the vehicle has been opened by the emergency key 25 and sends the detection signal to the power supply control unit 15.

Referring to FIG. 3, an illuminator 34, which is formed by a light-emitting diode (LED) or an electroluminescence (EL) device, is arranged in the vicinity of the key cylinder 4. The illuminator 34 is electrically connected to the power supply control unit 15 and is activated and inactivated in accordance with an activation signal from the power supply control unit 15. In the preferred embodiment, the illuminator 34 is generally annular and extends around the periphery of the key cylinder 4. When activated, the illuminator 34 illuminates the key cylinder 4.

The power supply control unit 15 sends an activation signal to the illuminator 34 when a detection signal is received from the door lock detector 19 to illuminate the illuminator 34 and notify the driver where the emergency key 25 should be inserted. In this embodiment, the power supply control unit 15 functions as a depositing instruction device.

The preferred embodiment has the advantages described below.

When the door lock is opened with the emergency key 25, the power supply control unit 15 illuminates the illuminator 34 in the passenger compartment. Accordingly, even when starting the engine with the emergency key 25, which is seldom used, the driver easily finds the location where the emergency key 25 is to be deposited.

When the door lock is opened with the emergency key 25, there is a high possibility that smart communication cannot be performed between the portable communicator 11 and the vehicle controller 12 due to reasons such as battery drainage of the portable communicator 11. The illumination of the illuminator 34 in only such cases reduces power consumption.

The key cylinder 4, which locks and unlocks the glove compartment 3, also functions as a seat for the emergency key 25. Thus, a separate seat for the emergency key 25 does not have to be provided in the passenger compartment. This reduces the number of components and decreases the production cost.

The vehicle controller 12 enables the starting of the engine when the emergency key 25 is inserted in the key cylinder 4 and turned in the counterclockwise direction. In the turned state, the emergency key 25 cannot be removed from the key cylinder 4. This prevents the emergency key 25 from falling out of the key cylinder 4 when the engine is running.

Subsequent to the depositing and turning of the emergency key 25 in the key cylinder 4, the vehicle controller 12 executes emergency engine start enabling control using transponder verification. This maintains a high security level.

The above embodiment may be modified as described below.

Referring to FIG. 2, a key cylinder 7 for locking and unlocking a box 6, such as a coin box located in the middle portion of the dashboard 5 may be used as the emergency key seat 31. Further, a key cylinder 9 for use in a gearshift lock mechanism that locks and unlocks a gearshift lever 8 may also be used as the emergency key seat 31, as shown in FIG. 2.

In the key cylinder 4 of the embodiment shown in FIGS. 1 to 3, the key cylinder 4 may be fixed so that it cannot be turned. In such a case, the emergency engine start control is performed when the emergency key 25 is inserted in the key cylinder 4. This would eliminate the need for performing the two operations of inserting the emergency key 25 in the key cylinder 4 and turning the emergency key 25. The emergency engine start control would be executed just by performing the insertion of the emergency key 25. This improves the operability of the vehicle.

A key holding mechanism (not shown) that disables the removal of the emergency key 25 when the engine is running may be added to the emergency key seat 31. More specifically, a key holding mechanism, which is formed by an actuator such as a solenoid, is arranged in an inner portion of the key cylinder 4. The power supply control unit 15 controls and activates the key holding mechanism to disable the removal of the emergency key 25 when the engine is running. This ensures that the emergency key is prevented from falling out of the key cylinder 4 when the engine is running.

In this case, the key holding mechanism may be activated only when the engine is started by transponder communication and not activated when the engine is started by smart communication. This would enable the opening and closing of the glove compartment even when the engine is running as long as the engine is started through smart communication.

In the embodiment of FIGS. 1 to 3, the portable communicator 11 and the emergency key 25 may be formed integrally.

A second embodiment of the present invention will now be discussed with reference to FIGS. 4 and 5. To avoid redundancy, like or same reference numerals are given to those components that are the same as the corresponding components of the first embodiment. The description centers on parts differing from the first and second embodiments.

Figure 4:
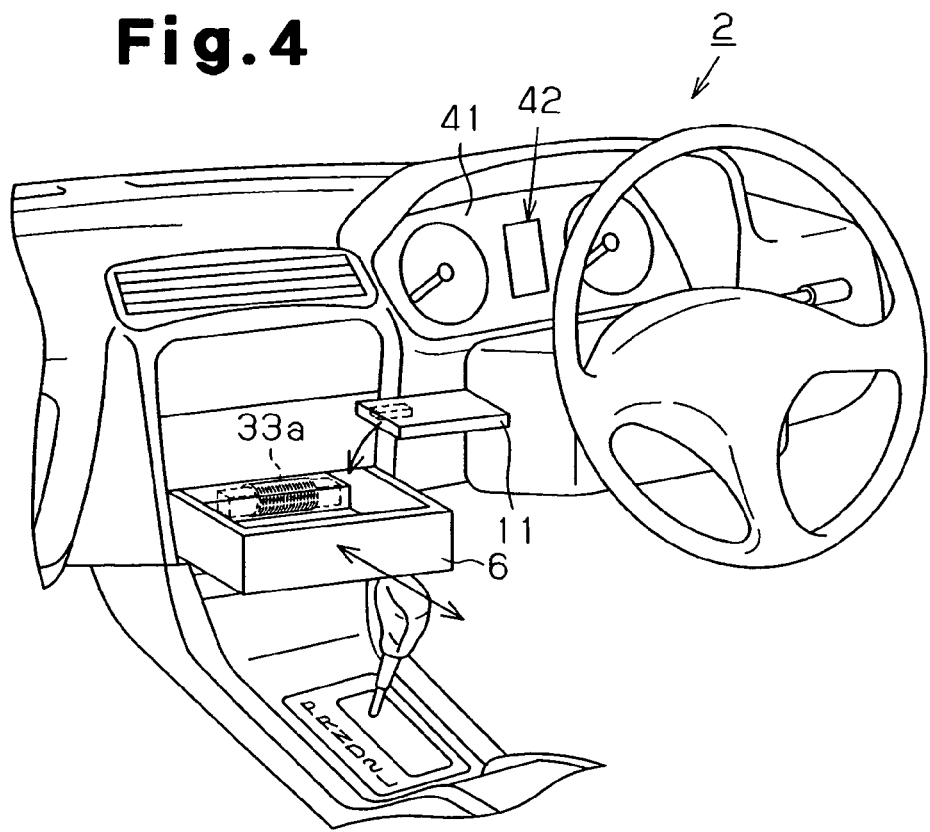
FIG. 4 is an enlarged partial perspective view showing part of a passenger compartment in which an engine start control system according to a second embodiment of the present invention is installed.

Referring to FIG. 4, in the preferred embodiment, the communication antenna 33a of the transponder communication unit 33 is arranged in the box 6 to transmit a transponder drive radio wave in the box 6. The box 6 is opened and closed by moving the box 6 in the directions of the arrows. Further, the portable communicator 11 may be deposited in the box 6. In the preferred embodiment, the emergency key seat 31 corresponds to the box 6.

Referring to FIG. 5, the emergency key seat 31 includes the transponder communication unit 33, an open/close sensor 35, and an opening mechanism 36. The opening mechanism 36 includes an actuator, such as a motor, that is activated to automatically open and close the box when predetermined conditions are satisfied. In addition to the automatic opening and closing with the opening mechanism 36, the box may be manually opened. The open/close sensor 35 and the opening mechanism 36 are electrically connected to the power supply control unit 15.

The portable communicator 11 includes a smart communication unit 11a, which communicates with the transceiver 13 of the vehicle controller 12, and the transponder control unit 26.

The portable communicator 11 includes a mechanical key identical to that of the emergency key 25. The mechanical key is used to open and close the door lock. In the second embodiment, the portable communicator 11 functions as an emergency key mechanism. The smart communication unit 11a is powered by a battery incorporated in the portable communicator 11 and performs smart communication with the transceiver 13.

When communication is established between the smart communication unit 11a of the portable communicator 11 and the transceiver 13, the vehicle controller 12 enables the starting of the engine after unlocking a steering mechanism.

When the power supply control unit 15 receives a detection signal from the door lock detector 19 indicating that the mechanical key has opened the door lock, the power supply control unit 15 sends a drive signal to the opening mechanism 36 to drive the actuator and open the box 6. The automatic opening of the box 6 notifies the driver that the portable communicator 11 is to be deposited in the box 6. In the second embodiment, the opening mechanism 36 functions as a depositing instruction device, and the box 6 functions as a deposit guide.

When the power supply control unit 15 receives a signal from the open/close sensor 35 indicating that the box has been closed, the power supply control unit 15 sends a transponder drive signal to the verification control unit 14. When the verification control unit 14 receives the transponder drive signal, the verification control unit 14 sends a drive signal to the transponder communication unit 33. In response to the drive signal, the transponder communication unit 33 transmits the transponder drive radio wave from the communication antenna 33a. The transponder drive radio wave is transmitted to the space in the box 6. Thus, the portable communicator 11 receives the transponder drive radio wave as long as the portable communicator 11 is deposited in the box 6. When the transponder control unit 26 of the portable communicator 11 receives the transponder drive radio wave, the transponder control unit 26 outputs the response signal. In other words, transponder communication is performed between the portable communicator 11 and the vehicle controller 12. The vehicle controller 12 enables the starting of the engine when transponder communication is established. Accordingly, in the same manner as the embodiment of FIGS. 1 to 3, under an emergency such as when communication of the portable communicator 11 with the vehicle controller is disabled due to battery drainage, the depositing of the portable communicator 11 in the box 6 enables the starting of the engine.

The second embodiment has the advantages described below.

When the portable communicator 11 is deposited in the box 6 and transponder communication is performed between the portable communicator 11 and the vehicle controller 12, the starting of the engine is started when transponder communication is established. Thus, if normal communication (smart communication) between the portable communicator 11 and the vehicle controller 12 is disabled such as when battery drainage of the portable communicator 11 occurs, the starting of the engine is enabled by depositing the portable communicator 11 in the box 6. When the door lock is opened with the mechanical key, the power supply control unit 15 drives the opening mechanism 36 to automatically open the box. This instructs the driver to deposit the portable communicator 11 in the box 6. Accordingly, even when starting the engine with the emergency key mechanism, which is seldom used, the driver easily finds the location where the portable communicator 11 is to be deposited.

When the door lock is opened with the mechanical key, there is a high possibility that smart communication cannot be performed between the portable communicator 11 and the vehicle controller 12 due to a reason such as battery drainage of the portable communicator 11. Further, there is a high possibility that the engine is started through transponder communication between the portable communicator 11 and the vehicle controller 12. Thus, the automatic opening of the box 6 in such a state reduces power consumption.

Small articles such as coins may be kept in the box 6, which is also used to deposit the portable communicator 11. Thus, a separate space for performing transponder communication is not necessary. This decreases the manufacturing cost of the vehicle 2. Further, the box 6 is kept closed when the engine is running to prevent the portable communicator 11 from being removed from the box 6.

The starting of the engine is enabled just by depositing the portable communicator 11 in the box 6. This facilitates execution of the emergency engine start enabling control.

It should be apparent to those skilled in the art that the present invention may be embodied in many other specific forms without departing from the spirit or scope of the invention. Particularly, it should be understood that the present invention may be embodied in the following forms.

In the embodiment of FIGS. 4 and 5, the opening mechanism 36 of the emergency key seat 31 may enable the opening of the box 6 even when the engine is running.

The emergency key seat 31 does not have to be the box 6 and may be any type of holder for accommodating articles such as a holder arranged in the glove compartment 3 or in the driver seat side door.

In the embodiment of FIGS. 4 and 5, an emergency portable communicator provided with the transponder control unit 26 may be provided separately from the portable communicator 11. Such emergency portable communicator may be used as the emergency key mechanism.

In the embodiment of FIGS. 1 to 3, the illuminator 34 is illuminated to notify the driver where to insert the emergency key 25. However, the notification may be given by a display message or a voice guidance. More specifically, a message display, such as a liquid crystal panel, may be arranged on the instrument panel 41 of the vehicle 2, as shown in FIG. 4. Alternatively, a voice guidance device, such as a speaker, may be arranged in the vehicle compartment of the vehicle 2.

The illumination, the notification, the menu display, and the voice guidance may be combined as required to generate the instruction for the driver.

In the embodiments of FIGS. 1 to 5, the opening and closing of the door after the mechanical key opens the door lock may trigger the generation of the insert notification for the driver.

In the embodiments of FIGS. 1 to 5, a transponder communication unit may be installed in a door to trigger the generation of a insert notification for the driver when the door lock is opened with the transponder. Accordingly, the notification for the driver may be generated using the opening of the door lock as a trigger instead of relying on the communication between the portable communicator 11 and the transceiver 13.

The embodiments of FIGS. 1 to 5 are employed in the one-push type engine start control system 1. However, the present invention may be employed in any engine start control system that has a smart ignition function.

The present examples and embodiments are to be considered as illustrative and not restrictive, and the invention is not to be limited to the details given herein, but may be modified within the scope and equivalence of the appended claims.

The invention claimed is:

1. An engine starting controller for controlling the opening and closing of a door lock and for controlling the starting of an engine for a vehicle in accordance with communication performed with a portable communicator having a communication mechanism and an emergency key mechanism, the engine starting controller comprising:

an emergency engine start enabling device for enabling the starting of the engine when the emergency key mechanism is deposited on an emergency key seat arranged in a passenger compartment of the vehicle; and a deposit instruction device for instructing the depositing of the emergency key mechanism on the emergency key seat when the door lock is opened with the emergency key mechanism.

2. The engine starting controller according to claim 1, wherein the deposit instruction device is located on the emergency key seat or in the vicinity of the emergency key seat, and is illuminated when the door lock is opened with the emergency key mechanism.

3. The engine starting controller according to claim 1, wherein the deposit instruction device displays information for instructing the depositing of the emergency key mechanism or information showing where the emergency key seat is located on a display when the door lock is opened with the emergency key mechanism.

4. The engine starting controller according to claim 1, wherein the deposit instruction device announces information for instructing the depositing of the emergency key mechanism or information showing where the emergency key seat is located with a voice when the door lock is opened with the emergency key mechanism.

5. The engine starting controller according to claim 1, wherein the deposit instruction device moves the emergency key seat from a position disabling depositing of the emergency key mechanism to a position enabling depositing of the emergency key mechanism when the door lock is opened with the emergency key mechanism.

6. The engine starting controller according to claim 1, wherein the emergency key seat is a key cylinder used in a locking mechanism for locking and unlocking a multipurpose container arranged in the passenger compartment, and the emergency key mechanism is a mechanical key deposited in the key cylinder.

7. The engine starting controller according to claim 1, wherein the emergency key seat is a key cylinder for a gearshift locking mechanism that is unlocked by a mechanical key, and the emergency key mechanism is the mechanical key and deposited in the key cylinder.

8. The engine starting controller according to claim 1, wherein the emergency key seat includes a transponder control unit for outputting a response signal with electromotive force generated from a predetermined transponder drive radio wave, the emergency key seat is a multipurpose container, and the emergency engine start enabling device includes a transponder communication unit for transmitting the transponder drive radio wave in the multipurpose container to perform communication with the transponder control unit.

9. The engine starting controller according to claim 1, wherein the deposit instruction device notifies the depositing of the emergency key mechanism when a door of the vehicle is closed after a mechanical key opens the door lock of the door.

10. The engine starting controller according to claim 1, wherein the deposit instruction device functions to announce a location of the emergency key seat.

11. An engine starting control system comprising:
a portable communicator having a communication mechanism and an emergency key mechanism;
a vehicle controller for controlling the opening and closing of a door lock and for controlling the starting of an engine for a vehicle in accordance with communication performed with the portable communicator, the vehicle controller including:
an emergency engine start enabling device for enabling the starting of the engine when the emergency key mechanism is deposited on an emergency key seat arranged in a passenger compartment of the vehicle; and
a location notification device for notifying the location of the emergency key seat when the door lock is opened with a mechanical key.

12. The engine starting control system according to claim 11, wherein the location notification device is located on the emergency key seat or in the vicinity of the emergency key seat, and is illuminated when the door lock is opened with the mechanical key.

13. The engine start controlling system according to claim 11, wherein the location notification device displays information for notification the depositing of the emergency key mechanism or information showing where the emergency key seat on a display when the door lock is opened with the mechanical key.

14. The engine start controlling system according to claim 11, wherein the location notification device announces information for notification the depositing of the emergency key mechanism or information showing where the emergency key seat with a voice when the door lock is opened with the mechanical key.

15. The engine start controlling system according to claim 11, wherein the location notification device moves the emergency key seat from a position disabling depositing of the emergency key mechanism to a position enabling depositing of the emergency key mechanism when the door lock is opened with the mechanical key.

16. The engine start controlling system according to claim 11, wherein the emergency key seat is a key cylinder used in a locking mechanism for locking and unlocking a multipurpose container arranged in the passenger compartment, and the emergency key mechanism is a mechanical key deposited in the key cylinder.

17. The engine start controlling system according to claim 11, wherein the emergency key seat is a key cylinder for a gearshift locking mechanism that is unlocked by a mechanical key, and the emergency key mechanism is the mechanical key and deposited in the key cylinder.

18. The engine start controlling system according to claim 11, wherein the emergency key seat includes a transponder control unit for outputting a response signal with electromotive force generated from a predetermined transponder drive radio wave, the emergency key seat is a multipurpose container, and the emergency engine start enabling device includes a transponder communication unit for transmitting the transponder drive radio wave in the multipurpose container to perform communication with the transponder control unit.

19. The engine start controlling system according to claim 11, wherein the location notification device notifies the location of the emergency key seat when a door of the vehicle is closed after a mechanical key opens the door lock of the door.

* * * * *